US005567424A

United States Patent [19]
Hastings

[11] Patent Number: 5,567,424
[45] Date of Patent: Oct. 22, 1996

[54] FIBER, ANTIOXIDANT, HERBAL AND ENZYME SUPPLEMENTED BEVERAGE COMPOSITION FOR HUMAN CONSUMPTION

[75] Inventor: Carl W. Hastings, Glencoe, Mo.

[73] Assignee: Reliv International, Inc., Chesterfield, Mo.

[21] Appl. No.: 258,421

[22] Filed: Jun. 10, 1994

[51] Int. Cl.⁶ .................. A61K 35/78; A61K 31/685; A61K 31/715
[52] U.S. Cl. .................. 424/195.1; 424/94.66
[58] Field of Search ................ 424/195.1, 94.66

[56] References Cited

U.S. PATENT DOCUMENTS

| | | | |
|---|---|---|---|
| 4,737,364 | 4/1988 | Kalogris | 424/195.1 |
| 5,294,606 | 3/1994 | Hastings | 514/53 |

*Primary Examiner*—Peter O'Sullivan
*Attorney, Agent, or Firm*—Tilton, Fallon, Lungmus & Chestnut

[57] ABSTRACT

The present invention involves a beverage composition that supplies fiber, herbs, antioxidants, and enzymes to the human body. This beverage composition can serve as a food supplement to deliver a combination of nutrients to the body to assist in maintaining good health.

11 Claims, No Drawings

FIBER, ANTIOXIDANT, HERBAL AND ENZYME SUPPLEMENTED BEVERAGE COMPOSITION FOR HUMAN CONSUMPTION

FIELD OF THE INVENTION

This invention relates to a beverage composition that supplies fiber, antioxidants, herbs, and digestive enzymes to the human body.

BACKGROUND OF THE INVENTION

Many sources, including the National Cancer Institute and the American Cancer Society, have issued reports encouraging more fiber consumption as a dietary recommendation to lower the risk of some types of cancer. While there is no actual recommended daily intake level established for fiber, most authorities agree that every individual needs between 30 to 35 grams (g) of fiber each day. In order to achieve this 30 g of fiber, an individual would have to consume the following: 10 servings oatmeal, 30 cups cornflakes, 30 slices of wheat bread, 10 cups cauliflower, 10 cups carrots, 8 potatoes, 8 medium apples, 8 bananas, 8 oranges and 20 peaches. It is no wonder then, that based on the amount of food which must be consumed to obtain this recommended daily intake level of fiber that the average individual gets less than half of the fiber he/she should.

Because of the health benefits associated with the intake of fiber, many individuals have begun to take fiber supplements as part of their daily diet. In fact, many fiber supplement products are currently being sold. These include:

FibreSonic (Matol)—A serving delivers 11 g of fiber comprised of both soluble and insoluble sources. There is no additional supplementation.

Fiber'n Mor (Omnitrition)—A serving delivers 7 g of both soluble and insoluble fiber. It is supplemented with 6 milligrams (mg) of Vitamin C (10% of RDI), 200 mg of Calcium (20% of RDI), 40 IU of Vitamin D (10% RDI), 40 mg of Magnesium (19% RDI), 0.2 mg of Copper (10% RDI), lmg of Manganese, 1 mg of Boron and 25 mg of Chromium. There are no herbs, digestive enzymes nor antioxidants other than the 6 mg of Vitamin C.

Metamucil (Proctor & Gamble and several private label mimics)—A 3.4 g dose of psyllium hyrodphilic mucilloid fiber is delivered per serving. This fiber source is 100% soluble, thus, no insoluble fiber is provided. There are no other active ingredients in Metamucil.

Mylanta (J&J/Merck)—A serving delivers 3.4 g of psyllium fiber. No other active ingredients.

Hydrocil Instant Fiber Supplement (Proctor & Gamble)—A serving delivers 3.5 g of psyllium fiber. No other active ingredients.

Perdiem Fiber (Distributed by Rhone-Poulenc Rorer Pharmaceutical)—A serving delivers 4 g of psyllium fiber. The label also claims 1.8 mg of sodium and 36 mg of potassium. No other active ingredients.

Maalox (Distributed by Rhone-Poulenc)—A serving delivers 3.4 g of psyllium fiber. No other active ingredients.

Restore (Inagra)—A serving delivers 3.4 g of psyllium fiber. No other active ingredients.

Fiberall (CIBA Consumer Pharmaceutical)—A serving delivers 3.4 g of psyllium fiber. Inactive ingredients include beta carotene (no level given), wheat bran and citric acid. No other active ingredients.

Citrucel (SmithKline Beecham)—A serving delivers 2 g of methylcellulose as a fiber source and 105 mg of potassium. No other active ingredients.

Konsyl (Konsyl Pharmaceutical)—A serving delivers 3.4 g of psyllium fiber. No other active ingredients.

Serutan (WKW, Inc.)—A serving delivers 2.5 g of psyllium fiber. Inactive ingredients include magnesium stearate, wheat germ and oat flour. No other active ingredients.

FI-BAR a-m (Natural Nectar Corp.)—A yogurt coated snack bar, each serving provides 5 g of fiber comprised of several sources, including apples, several cereal grains, gums and pectin. There are 15 vitamins and minerals provided in a bar with none over 15% of the RDI. There is no additional supplementation of antioxidants or other 'non RDI' nutrients.

In addition to fiber supplements, many individuals are beginning to recognize the added benefits of taking additional supplements in order to maintain good health and to protect against disease and illness. In particular, many individuals are taking antioxidants to help neutralize a class of atomic particles referred to as "free radicals". Free radicals are unstable oxygen molecules that damage cell structures. These damaging, ever-present molecules can be created by normal body chemical processes as well as by smoking, heat, radiation, alcohol, and certain pollutants. Antioxidants assist in repairing and fighting this process.

Besides antioxidants, many individuals are now taking herbal supplements. For thousands of years, people have turned to plants for healing help. In fact, plant substances remain the basis for a very large proportion of the medications used today for treating heart disease, hypertension, depression, pain, cancer, asthma, and other agents. For example, the herb rutin assists in capillary reconstruction including hypertension, allergy, heart and brain thrombosis, glaucoma, psoriasis and others. The herb blue vervain aids in digestion and is used as remedy for depression.

The present invention provides a beverage composition that supplies the body with fiber, herbs, antioxidants, and enzymes. No other product has been formulated to provide a combination of dietary supplements near that of the present invention.

SUMMARY OF THE INVENTION

The present invention involves a beverage composition that supplies fiber, herbs, antioxidants, and digestive enzymes to the human body. This beverage composition can serve as a food supplement to deliver nutrients to the body to assist in maintaining good health and to protect against disease and illness. The beverage composition is prepared as an essentially dry mixture and then mixed with an ingestible liquid to form an aqueous beverage.

The aqueous beverage composition of this invention is adapted for the oral administration of fiber, herbs, antioxidants, and enzymes to the human body. The composition delivers from about 5 to 15 g of fiber, 0.1 to 0.5 g herbs, 200 to 1000 mg Vitamin C, 150 to 300 IU Vitamin E, 2500 to 10,000 IU Vitamin A activity in the form of Beta Carotene and from about 15 to 30 mg proteolytic enzymes.

In another embodiment, the aqueous beverage composition of this invention delivers the following per serving:

from about 3.0 to 5.0 g gum arabic, 1.0 to 3.0 g soy fiber, 4.0 to 6.0 g corn bran, 0.5 to 1.5 g oat fiber, 0.25 to 1.0 g pea fiber, 0.5 to 1.5 g apple fiber, 0.1 to 0.5 g citrus fiber, 0.1 to 0.5 g carrageenan, 0.1 to 0.5 g guar gum and 0.1 to 0.5 g xanthan gum;

from about 5 to 15 mg each of garlic, cayenne, licorice root, kelp, oriental ginseng, siberian ginseng, aloe vera powder, chicory root, dandelion root, chamomile powder, alfalfa powder, ginger root, passion flower, capsicum fruit powder, fenugreek, hibiscus, rhubarb root, irish moss, pearl barley, celery seed and sarsaparilla;

from about 200 to 1000 mg of Vitamin C, 150 to 300 IU of Vitamin E and 2500 to 10,000 IU Vitamin A activity in the form of Beta Carotene; and from about 5 to 10 mg each of pepsin, papain and bromelain.

In still another embodiment, the aqueous beverage composition delivers the following per serving:

2.3 g gum arabic, 1.3 g soy fiber, 5.1 g corn bran, 0.7 g oat fiber, 0.5 g pea fiber, 0.6 g apple fiber, 0.15 g citrus fiber, 0.12 g carrageenan, 0.12 g guar gum and 0.12 g xanthan gum;

7.3 mg each of garlic, cayenne, licorice root, kelp, oriental ginseng, siberian ginseng, aloe vera powder, chicory root, dandelion root, chamomile powder, alfalfa powder, ginger root, passion flower, capsicum fruit powder, fenugreek, hibiscus, rhubarb root, irish moss, pearl barley, celery seed and sarsaparilla;

300 mg Vitamin C, 198 IU of Vitamin E and 3500 IU Vitamin A activity in the form of Beta Carotene; and 6 mg each of pepsin, papain and bromelain.

The beverage composition of this invention can also contain additional ingredients such as lecithin, citric acid, carbohydrates and a flavoring additive such as pineapple flavor.

DETAILED DESCRIPTION OF THE INVENTION

The present invention involves a fiber, herbal, antioxidant, and enzyme rich beverage composition. More specifically, the beverage composition comprises ten different kinds of fibers, a blend of 21 herbs, antioxidants, and enzymes. This beverage composition can serve as a food supplement to deliver this combination of nutrients to the human body.

The beverage composition of this invention is initially prepared as an essentially dry mixture. This mixture is prepared by blending together the proper amounts of all the required ingredients. Once blended, the composition can be delivered enterally as a beverage. The beverage is prepared by dissolving the proper amount of the essentially dry mixture in water, juice, or any other drinkable liquid. The recommended serving size is about 30 grams of the essentially dry mixture in 8 ounces of water, juice, or other ingestible liquid. As used herein the term "per serving" means 30 g of the essentially dry mixture mixed with 8 ounces of an ingestible liquid.

Fiber

The present invention contains the following fiber: gum arabic, soy fiber, corn bran, oat fiber, pea fiber, apple fiber, citrus fiber, carrageenan, guar gum and xanthan gum. This particular combination of fiber was selected because it provides both soluble and insoluble fiber sources to the body. Soluble and insoluble fiber are together referred to as dietary fiber.

Studies report that soluble and insoluble fiber have many benefits. Soluble fiber helps reduce blood cholesterol, particularly LDL, which is considered to be harmful to the body (LDL is often referred to as "bad" cholesterol). Because soluble fiber helps reduce the level of LDL cholesterol, soluble fiber can help reduce heart disease. Also, soluble fiber may also help reduce arterial clogging. In addition, many studies have suggested that soluble fiber may delay the absorption rate of sugar into the blood stream. Insoluble fiber is used to prevent or remedy constipation and diverticulosis and to protect against colon and rectal cancers.

The beverage composition of this invention delivers 5 to 15 g, but preferably 10 g of fiber per serving. The range and preferred amount of each of the fibers deliver per serving is listed below:

| FIBER | RANGE (g) | PREFERRED AMOUNT (g) |
|---|---|---|
| Gum arabic | 3.0–5.0 | 3.2 |
| Soy Fiber | 1.0–3.0 | 1.3 |
| Corn Bran | 4.0–6.0 | 5.1 |
| Oat Fiber | 0.5–1.5 | 0.7 |
| Pea Fiber | .25–1.0 | 0.5 |
| Apple Fiber | 0.5–1.5 | 0.6 |
| Citrus Fiber | 0.1–0.5 | 0.15 |
| Carrageenan | 0.1–0.5 | 0.12 |
| Guar Gum | 0.1–0.5 | 0.12 |
| Xanthan Gum | 0.1–0.5 | 0.12 |

Herbs

The present invention contains a blend of 21 different herbs. These herbs are: Garlic, Cayenne, Licorice root, Kelp, Oriental Ginseng, Siberian Ginseng, Aloe Vera Powder, Chicory root, Dandelion root, Chamomile Powder, Alfalfa Powder, Ginger root, Passion flower, Capsicum Fruit Powder, Fenugreek, Hibiscus, Rhubarb root, Irish moss, Pearl barley, Celery seed, and Sarsaparilla. The beverage composition of this invention delivers 0.1 to 0.5 g, but preferable 0.15 g of herbs per serving. Each of these herbs is present in the range of 5 to 15 mg but preferably 7.3 mg per serving. Each of these herbs in the beverage composition contains a high concentration of micronutrients. These nutrients have long been used for synergistic effects for the body. Recent research has suggested that they may be effective in the treatment of many disorders.

The herbs contained in the present invention were selected because of their known effects as well as the effects commonly suspected by the general expert community.

Antioxidants

The present invention contains the following antioxidants—Vitamin C (Ascorbic Acid), Vitamin E (d alpha tocopheryl acetate) and Beta Carotene. The beverage composition of this invention delivers the following antioxidants per serving:

| ANTIOXIDANT | RANGE | PREFERRED AMOUNT |
|---|---|---|
| Vitamin C | 200 to 1000 mg | 300 mg |
| Vitamin E | 150 to 300 IU* | 198 IU |
| Beta Carotene | 2500 to 10,000 IU Vitamin A activity | 3500 IU Vitamin A activity |

*IU = International Units.

Vitamin C serves many important roles in the body. In particular, Vitamin C promotes healthy teeth and gums, aids in iron absorption, maintains normal connective tissue, heals wounds, increases mental skills and increases energy and endurance in athletes. Vitamin E protects tissue against the damage of oxidation, helps in the formulation of red blood cells and the formulation of Vitamin K. Beta carotene is believed to help prevent and fight cancer and heart disease. Beta carotene also helps to form and maintain healthy skin, teeth, membranes and skeletal and soft tissue. In addition, Beta carotene is converted to Vitamin A when needed by the body. Vitamin A promotes good vision by generating pigments necessary for the workings of the retina. Furthermore, both Beta carotene and Vitamin C are known to facilitate immune function. Finally, recent research has suggested that besides their other contributions to health, Vitamins C and E and Beta carotene may play important roles in averting or delaying coronary artery disease, cancer, cataracts, and other ills, and may even delay the effects of aging.

Enzymes

The present invention contains the following proteolytic enzymes—pepsin, papain, and bromelain. The beverage composition of this invention delivers 15 to 30 mg, but preferably 18 mg of enzymes per serving. Each of these enzymes is present in the amount of 5 to 10 mg, but preferably 6 mg per serving.

Pepsin, papain and bromelain are digestive enzymes. When food is eaten, it settles in the upper part of the stomach for a half of an hour to one hour before the digestive process continues. This portion of the stomach where the food settles is called the food enzyme section, because it is here that enzymes in the food begin working on digestion. However, if the food has been cooked, none of these enzymes are present, and the food just sits. By taking enzyme supplements such as pepsin, papain and bromelain, immediate digestion begins on this food. Because these additional enzymes are present in the stomach to start digestion, less energy and enzymes are expended by the body in completing the digestive process. Therefore, the body can devote this extra energy to supplying additional metabolic enzymes to other organs and tissue. These additional enzymes assist these organs and tissues to more efficiently perform their functions, provide repairs, and promote cures.

Other Ingredients

In addition to the above disclosed ingredients, the invention can also contain lecithin, flavoring agents, citric acid, and carbohydrates.

The beverage composition of this invention may include a soy lecithin in the range of 0.2 to 0.7 g, but preferably in the amount of 0.5 g per serving. The soy lecithin is used as an emulsifier and processing aid to improve flow properties.

The beverage composition can also contain a flavoring additive. This flavoring additive can include fruit flavors, botanical flavors and mixtures thereof. As used herein, the term "fruit flavor" denotes flavors derived from natural edible reproductive parts of seed plants as well as synthetically prepared flavors made to stimulate fruit flavors derived from natural sources. Flavoring additives can include pineapple flavor, orange flavor, lemon flavor, lime flavor, fruit punch and mixtures thereof. Other flavors such as grape flavor, cherry flavor, apple flavor and mixtures thereof can also be used. The amount of the flavor used depends upon the flavor or flavors selected, the flavor impression desired and the form of flavor additive used.

The beverage composition may also contain citric acid in the range of 0.05 to 0.10 g, but preferably in the amount of 0.09 g per serving. The citric acid lowers the pH of the composition and enhances the flavor.

The beverage composition may also include a carbohydrate source. In particular, these carbohydrates are composed of fructose and maltodextrin. The carbohydrates present in this composition range from about 20 to 30 g, and preferably 28 g per serving. The carbohydrates consist of 91% by weight fructose and 9% by weight maltodextrin. The carbohydrate source provides a combination of simple and complex carbohydrates. Fructose is a simple carbohydrate and provides sweetness, while not disrupting blood sugar levels. Maltodextrin is a complex carbohydrate. The present percentages of fructose and maltodextrin was selected to provide the best taste.

EXAMPLE 1

Table 1 shows how to make the blend of the 21 herbs within the scope of this invention. This herb blend can be combined with the other disclosed essentially dry ingredients to provide a beverage composition within the scope of this invention.

TABLE 1

| Ingredient | Weight (lbs) |
| --- | --- |
| Oriental Ginseng | 25.00 |
| Garlic | 25.00 |
| Cayenne | 25.00 |
| Licorice Root | 25.00 |
| Kelp | 25.00 |
| Rhubarb Root | 25.00 |
| Hibiscus | 25.00 |
| Irish Moss | 25.00 |
| Siberian Ginseng | 25.00 |
| Aloe Vera Powder | 25.00 |
| Chicory Root | 25.00 |
| Dandelion Root | 25.00 |
| Chamomile Powder | 25.00 |
| Alfalfa Powder | 25.00 |
| Pearl Barley | 25.00 |
| Ginger Root | 25.00 |
| Celery Seed | 25.00 |
| Sarsaparilla | 25.00 |
| Passion Flower | 25.00 |
| Capsicum Fruit Powder | 25.00 |
| Fenugreek | 25.00 |
| | 525.00 |

EXAMPLE 2

Table 2 shows how to make a pineapple-flavored composition within the scope of the invention. The composition is prepared by mixing the ingredients listed below to form an essentially dry mixture. To make an orally deliverable beverage composition within the scope of this invention, 30 g of this blended essentially dry mixture is mixed with 8 ounces of water, juice or other liquid.

TABLE 2

| Ingredient | Weight (lbs) |
| --- | --- |
| Fructose | 971.80 |
| Maltodextrin | 97.00 |
| Liquid Lecithin | 34.80 |

TABLE 2-continued

| Ingredient | Weight (lbs) |
| --- | --- |
| Gum Arabic | 213.20 |
| Microcorn Bran | 339.20 |
| Pineapple Flavor | 27.20 |
| d Alpha Tocopheryl Acetate | 20.00 |
| Soy fiber | 85.20 |
| Snowhite Oat Fiber | 48.40 |
| Pea Fiber | 35.80 |
| Apple Fiber | 38.80 |
| Citrus Fiber | 9.40 |
| Carrageenan | 7.80 |
| Guar Gum | 7.80 |
| Xanthan Gum | 7.80 |
| Beta Carotene | 14.20 |
| Citric Acid | 6.00 |
| 21 Herb Blend | 10.20 |
| Papain | .40 |
| Pepsin | .40 |
| Bromelain | .40 |
| Ascorbic Acid | 24.20 |
| | 2000.00 |

Although the invention has been described primarily in connection with special and preferred embodiments, it will be understood that it is capable of modification without departing from the scope of the invention. The following claims are intended to cover all variations, uses, or adaptations of the invention, following, in general, the principles thereof and including such departures from the present disclosure as come within known or customary practice in the field to which the invention pertains, or as are obvious to persons skilled in the field.

I claim:

1. An aqueous beverage composition adapted for oral administration of both soluble and insoluble fiber, antioxidants, herbs and enzymes to the human body, comprising per serving:

from about 3.0 to 5.0 g gum arabic, 1.0 to 3.0 g soy fiber, 4.0 to 6.0 g corn bran, 0.5 to 1.5 g oat fiber, 0.25 to 1.0 g pea fiber, 0.5 to 1.5 g apple fiber, 0.1 to 0.5 g citrus fiber, 0.1 to 0.5 g carrageenan, 0.1 to 0.5 g guar gum and 0.1 to 0.5 g xanthan gum;

from about 5 to 15 mg each of garlic, cayenne, licorice root, kelp, oriental ginseng, siberian ginseng, aloe vera powder, chicory root, dandelion root, chamomile powder, alfalfa powder, ginger root, passion flower, capsicum fruit powder, fenugreek, hibiscus, rhubarb root, irish moss, pearl barley, celery seed and sarsaparilla;

from about 200 to 1000 mg Vitamin C, 150 to 300 IU Vitamin E and 2500 to 10,000 IU Vitamin A activity in the form of Beta Carotene; and from about 5 to 10 mg each of pepsin, papain and bromelain.

2. The composition of claim 1 further comprising from about 0.2 to 0.7 g soy lecithin, 0.05 to 0.10 g citric acid and 20 to 30 g carbohydrates per serving.

3. The composition of claim 2 further comprising pineapple flavor.

4. The composition of claim 2 wherein the carbohydrates consist of 91% by weight fructose and 9% by weight maltodextrin.

5. An aqueous beverage composition adapted for oral administration of fiber, antioxidants, herbs and enzymes to the human body, comprising per serving:

from about 5 to 15 g of both soluble and insoluble fiber including gum arabic, soy fiber, corn bran, oat fiber, pea fiber, apple fiber, citrus fiber, carrageenan, guar gum, and xanthan gum;

from about 0.1 to 0.5 g herbs including garlic, cayenne, licorice root, kelp, oriental ginseng, siberian chamomile powder, alfalfa powder, ginger root, passion flower, capsicum fruit powder, fenugreek, hibiscus, rhubarb root, irish moss, pearl barley, celery seed and sarsaparilla;

from about 200 to 1000 mg Vitamin C, 150 to 300 IU Vitamin E, and 2500 to 10,000 IU Vitamin A activity in the form of Beta Carotene; and from about 15 to 30 mg proteolytic enzymes including pepsin, papain and bromelain.

6. The composition of claim 5 further comprising from about 0.2 to 0.7 g soy lecithin, 0.05 to 0.10 g citric acid and 20 to 30 g carbohydrates per serving.

7. The composition of claim 5 further comprising pineapple flavor.

8. The composition of claim 5 comprising 10 g fiber, 0.15 g herbs, 300 mg Vitamin C, 198 IU Vitamin E, 3500 IU Vitamin A activity in the form of Beta Carotene and 18 mg proteolytic enzymes.

9. An aqueous beverage composition adapted for oral administration of both soluble and insoluble fiber, antioxidants, herbs and enzymes to the human body, comprising per serving:

3.2 g gum arabic, 1.3 g soy fiber, 5.1 g corn bran, 0.7 g oat fiber, 0.5 g pea fiber, 0.6 g apple fiber, 0.15 g citrus fiber, 0.12 g carrageenan, 0.12 g guar gum and 0.12 g xanthan gum;

7.3 mg each of garlic, cayenne, licorice root, kelp, oriental ginseng, siberian ginseng, aloe vera powder, chicory root, dandelion root, chamomile powder, alfalfa powder, ginger root, passion flower, capsicum fruit powder, fenugreek, hibiscus, rhubarb root, irish moss, pearl barley, celery seed and sarsaparilla;

300 mg Vitamin C, 198 IU of Vitamin E and 3500 IU Vitamin A activity in the form of Beta Carotene; and 6 mg each of pepsin, papain and bromelain.

10. The composition of claim 9 further comprising 0.5 g soy lecithin, 0.09 g citric acid and 28 g carbohydrates per serving.

11. The composition of claim 10 further comprising pineapple flavor.

* * * * *